No. 736,548. PATENTED AUG. 18, 1903.
R. A. RIPLEY.
ELECTRIC SYSTEM OF TRANSMISSION.
APPLICATION FILED JUNE 13, 1902.
NO MODEL.
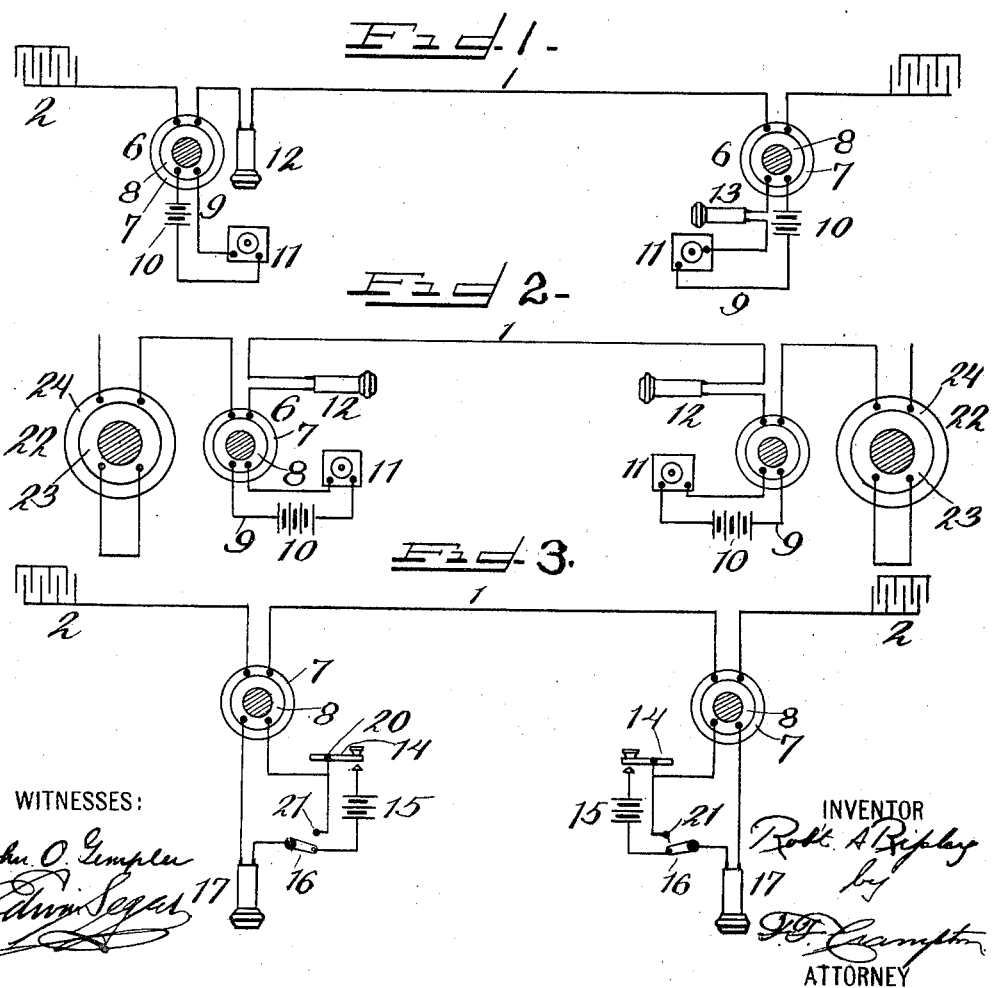
WITNESSES:
INVENTOR
Robt. A. Ripley
ATTORNEY No. 736,548. Patented August 18, 1903.

UNITED STATES PATENT OFFICE.

ROBERT A. RIPLEY, OF STAMFORD, CONNECTICUT, ASSIGNOR TO CHARLES G. BURKE, OF BROOKLYN, NEW YORK, AND JOHN Q. A. WHITTEMORE, OF BOSTON, MASSACHUSETTS.

ELECTRIC SYSTEM OF TRANSMISSION.

SPECIFICATION forming part of Letters Patent No. 736,548, dated August 18, 1903.

Application filed June 13, 1902. Serial No. 111,447. (No model.)

*To all whom it may concern:*

Be it known that I, ROBERT A. RIPLEY, a citizen of the United States, and a resident of Stamford, in the county of Fairfield and State of Connecticut, have invented a certain new and useful Improvement in Electric Systems of Transmission, of which the following is a specification, reference being had to the accompanying drawings, forming part thereof.

This invention relates to means for producing electrical disturbances on a single ungrounded line; and it has for its object to provide a system wherein there may be produced electrical transmission over a line which is neither grounded nor connected so as to form a complete circuit. The electricity thus transmitted may be used for any purpose, as signaling or telephonic communication.

The invention consists in providing at the ends of a line a capacity-body, which is any body having a sufficient area of surface to allow oscillations of electricity to be produced in the line. This body may be in the form of a condenser, a coil of wire either in the form of a resistance-coil or an induction-coil, or the body may be the body of the person or persons using the system, provided that the point of contact between the line and the body of such person or persons is of sufficiently low resistance. The oscillations may be produced by charging and discharging any form of an accumulator adapted to take up the charges of electricity.

The invention consists in further providing a means for producing electrical disturbances on the line and a means for detecting or receiving the said disturbances at the other end of the line.

The invention also consists in providing a local circuit in which is located a disturbing element and means for transforming the electrical disturbances upon the line. The means for producing electrical disturbances in the local circuit may be in the form of a key, a telephone-transmitter, or a generator of electricity. A receiving instrument either connected in the line or in a local circuit may also be provided for receiving the impulses or disturbances produced on the line by the key or transmitter.

The invention also consists in other features of construction and combinations of parts hereinafter described and claimed.

The invention is illustrated in the accompanying drawings, in which—

Figure 1 illustrates a system as connected for telephonic transmission of speech. Fig. 2 illustrates a modification of the system illustrated in Fig. 1. In the system shown in Fig. 2 induction-coils are substituted for condensers used in connection with the system shown in Fig. 1. Fig. 3 illustrates a system used for producing telegraphic signals, the key for the system being located in a local circuit.

In this form of a system the condensers are formed of sheets of tin-foil separated by paraffin paper in the manner well known in the art of manufacture of condensers. Surgings produced by any means will pass along the line, charging the condensers at each end of the line alternately with positive and negative charges, and by thus charging the condensers producing an oscillatory effect on the line which passes through other instrumentalities connected in the line and which may be used as a receiver. The capacity-body which permits me to thus produce surgings in a single ungrounded line may be in any form, provided that it is of sufficient area or capacity to allow for a sufficient quantity of electricity to pass through the instrument on the line to be affected thereby. The larger the capacity of the capacity-body the greater the quantity of electricity required to raise the potential of the capacity-body to the potential of the instrument or device producing the charging potential. Such an arrangement will therefore allow the charging and the discharging of the capacity-body and will permit of fluctuations being produced upon the line. The fluctuations thus produced may be received by any form of a receiver, such as a telephone-receiver, or by means of a relay, which may be used in turn to produce corresponding fluctuations through a local circuit or upon another section of the said line.

In Fig. 1 I have illustrated a system connected for the transmission of telephonic speech-waves. 1 illustrates the single ungrounded main line. At the ends of the line are connected condensers 2. Also at the ends of the line are located induction-coils 6. The long wire coils 7 of the induction-coils are connected in series with the line and form a part thereof. The short coarse-wire coils 8 are connected in a local circuit 9. The local circuit 9 has the usual battery 10 and transmitter 11.

The telephone-receiver may be connected either in series in the main line 1 or it may be connected in the local circuit. I have shown on the left side of Fig. 1 the telephone-receiver 12 connected in series in the line. When the receiver is connected in this way, I have found that it is preferable to use a receiver having a high-resistance coil or a coil of a large number of turns. On the right side of Fig. 1 I have illustrated the receiver 13 connected in the local circuit. I have found that the preferable form of a receiver when thus connected is one having a low-resistance coil for operating its diaphragm.

In the operation of the system the electrical disturbance or the electrical speech-waves are produced by the varying resistance of the transmitter through which the current of the battery 10 passes. The fluctuations or disturbances produced by the transmitter 11 are transformed by the induction-coil 6 upon the line. The fluctuations thus produced on the line charge the capacity-bodies 2 2, located at the ends of the line, alternately with positive and negative electricity. The fluctuations which are thus allowed to pass through the instruments of the line to and from the capacity-bodies located at the ends of the line produce electrical effects in those instruments. In the induction-coil 6, located at the other end of the line, there will be produced a transformation of the fluctuations thus formed on the line. These transformed currents will be received in the telephone-receiver 13, and the diaphragm of the receiver will vibrate in practically the same manner as the diaphragm of the transmitter into which one of the parties is speaking. If, however, transmission of speech is from the station illustrated on the right side of a figure to the station illustrated on the left side of a figure, the telephonic speech-waves will be received directly in the receiver 12 without any transformation of the impulses produced by the transmitter located at the opposite end of the line, the action of the telephone-receiver being the same as that of the telephone-receiver 13.

In Fig. 2 is illustrated a modification of the system shown in Fig. 1, wherein induction-coils 22 are substituted for the condensers of the system shown in the said Fig. 1. I have found that the best result is produced in this form of a system when the short wire coil 23 is short-circuited—that is, when the ends of the coil are connected together. By thus connecting the ends of the short wire coil the charging of the long fine-wire coil 24 alternately positive and negative appears to be more easily accomplished, and consequently better results are produced in the receiver than when the coil is open.

In Fig. 3 I have illustrated a system to be used in connection with the transmission of telegraphic signals. There is located at each end of the line the induction-coil 6 of practically the same form as that illustrated in Figs. 1 and 2. The local circuits connected to the short wire coils 8 of the induction-coils 6 include Morse keys 14, batteries 15, switches 16, and some receiving means, as telephone-receivers 17. The coil 8 is connected to the pivot 20 of a key 14. The pivot 20 of the key 14 is connected to a contact 21 of the switch 16. When the signal is to be received by the receiving means, such as a sounder or a telephone-receiver 17, the switch 16 is moved to one side to make contact with the contact 21, thus disconnecting the battery 15. When the signals are to be sent, the switch 16 is connected with the battery 15 and the electrical disturbances or impulses are produced in the local circuit by the operation of the key 14 in the manner well known in the art of telegraphy. The disturbances thus produced are transformed by the induction-coil 6 onto the line 1, and the capacity-bodies 2 2, located at the ends of the line, are charged alternately positive and negative. The fluctuations thus produced on the line are transformed into the local circuit, located at the other end of the line, and received by the receiving means 17.

In the local circuits located at each end of the line there may be connected an ordinary telegraphic relay, which will produce similar fluctuations either in a local circuit or in an adjoining section of the said line. When the relay produces fluctuations in adjoining sections of the line, transmission of the signals may be produced over any distance.

My invention may be further modified or it may be used for many different purposes other than those which I have described without in any way departing from the spirit thereof. I have merely described the preferred forms and uses of my invention in the above specification.

What I claim as new, and desire to secure by Letters Patent, is—

1. In an electric system a single ungrounded metallic line, a capacity-body connected to each end of the said line, a local circuit, an induction-coil having one of its coils connected to said line and the other of said coils connected to the said local circuit, means for producing electrical disturbances in the said local circuit and means for detecting the said disturbances produced in the said line.

2. In an electric system a single ungrounded metallic line, a capacity-body connected to each end of the said line, a local circuit, means for producing impulses in the said local circuit and means for transforming the said impulses into impulses of a similar character on the said line and a telephone-receiver connected to the said line.

3. In an electric system a single ungrounded metallic line, a capacity-body connected to each end of the said line, a local circuit located at each end of the said line, means for producing impulses in the said local circuit and means for transforming the said impulses into impulses of a similar character on the said line and a telephone-receiver connected in series at each end of the said line.

4. In an electric system a single ungrounded metallic line, a capacity-body connected to each end of the said line, a local circuit, a battery and a key connected in the said local circuit for producing impulses in the said local circuit and means for transforming the said impulses into impulses of a similar character on the said line and a telephone-receiver connected to the said line.

5. In an electric system a single ungrounded metallic line, a capacity-body connected to each end of the said line, a local circuit located at each end of the said line, a battery and a key connected in the said local circuit for producing impulses in the said local circuit and means for transforming the said impulses into impulses of a similar character on the said line and a telephone-receiver connected to the said line.

6. In a telephone system the combination with an ungrounded line wire or conductor, of accumulators of electricity connected to the terminals of the said line, local circuits at the ends of the line, induction-coils having their fine-wire coils in the line and their coarse-wire coils in the local circuits, telephone-receivers in one or more of the said local circuits, and a transmitter in other of said local circuits, as set forth.

In testimony whereof I have signed my name to this specification in the presence of two subscribing witnesses.

ROBERT A. RIPLEY.

Witnesses:
F. F. CRAMPTON,
EDWIN SEGER.